455-603 AU 233 EX

FIP8106 OR 4,234,967

United States Patent [19]

Henschel

[11] 4,234,967

[45] Nov. 18, 1980

[54] OPTICAL SIGNAL TRANSMITTER

[75] Inventor: John P. Henschel, White Bear, Minn.

[73] Assignee: Minnesota Mining and Manufacturing Company, St. Paul, Minn.

[21] Appl. No.: 952,959

[22] Filed: Oct. 20, 1978

[51] Int. Cl.$^3$ .......... H04B 9/00; H04B 1/04; H02J 9/02; H01M 10/44

[52] U.S. Cl. .......... 455/603; 455/117; 455/127; 307/10 BP; 307/10 LS; 307/157; 320/9; 340/34

[58] Field of Search .......... 340/34; 250/199; 325/151, 185, 186; 307/10 BP, 10 LS, 126, 157; 320/9

[56] References Cited

U.S. PATENT DOCUMENTS

| | | | |
|---|---|---|---|
| 2,936,387 | 10/1960 | Steele | 313/22 |
| 3,550,078 | 12/1970 | Long | 340/34 |
| 3,904,948 | 9/1975 | Earle | 307/10 BP |

*Primary Examiner*—Robert L. Griffin
*Assistant Examiner*—Edward L. Coles
*Attorney, Agent, or Firm*—Cruzan Alexander; Donald M. Sell; William D. Bauer

[57] ABSTRACT

An optical signal transmitter for use by priority vehicles for remotely controlling traffic signals, including a light source which is flashed at a controlled repetition rate to transmit an optical signal to a receiver located at the traffic intersection. Circuitry associated with the light source includes a comparator network for disabling an electrical energy supply in the event of certain predetermined operating conditions.

8 Claims, 2 Drawing Figures

OPTICAL SIGNAL TRANSMITTER

BACKGROUND OF THE INVENTION

1. Field of the Invention

This invention relates to an optical signal transmitter for use in controlling traffic signals.

2. Description of the Prior Art

Traffic signal remote control systems are known in the art from U.S. Pat. No. Re. 28,100 to W. H. Long and assigned to Minnesota Mining and Manufacturing Company. Although the system described in that patent is commercially successful, there is still a need to reduce the size and power consumption of the optical signal transmitter used in the system and to enhance the compatability of the transmitter in various types of vehicles so as to improve the overall reliability.

SUMMARY OF THE INVENTION

In order to overcome at least some of the disadvantages of such transmitters, the optical signal transmitter of the present invention includes a feature which disables the light source included therein in the event certain operating conditions occur. This transmitter comprises a light source for converting stored electrical energy into light energy in response to a trigger signal from a trigger repetition rate generator. An electrical energy supply means supplies energy to an electrical energy storage means. The electrical energy supply means is coupled to a disable means. The disable means turns off the electrical energy supply means where a disable signal is generated. An input signal reflects a measured operating condition. The disable signal, which controls the electrical energy supply means such that the light source may be operated only under predetermined conditions, is generated by a comparator which compares the reference signal with the input signal.

It is desirable to disable the electrical energy supply means under a variety of measured operating conditions. In the preferred embodiment, it is desirable to turn the electrical energy supply means off when the electrical energy storage means is sufficiently charged. In this manner the electrical energy supply means is controlled to prevent overcharging of the storage means. An input signal indicative of this condition is developed by a voltage divider associated with the storage means. The divider indicates the amount of energy stored in the electrical storage means and is used to generate one input signal.

It is also desirable to disable the electrical energy supply means when an overvoltage condition is present in the vehicle electrical system. When this operating condition is present, disabling the electrical energy supply means protects the circuitry of the optical signal transmitter. An input signal indicative of this overvoltage condition is developed and likewise coupled to the comparator.

Furthermore, in the preferred embodiment, an input signal is developed and used to disable the electrical energy supply means whenever a trigger signal is generated. This feature causes the electrical energy supply means to be disabled as a flash is initiated at the light source. By turning the energy supply means off while the light source is on, the duration of the flash of the light source is limited, since the electrical energy supply means is no longer supplying energy to the storage means. Consequently, the lamp will extinguish when the electrical energy supply means is fully discharged. This inhibits or prevents a low intensity glow from the light source which could occur if the energy supply means was left on.

DETAILED DESCRIPTION OF THE PREFERRED EMBODIMENT

Figure 1:
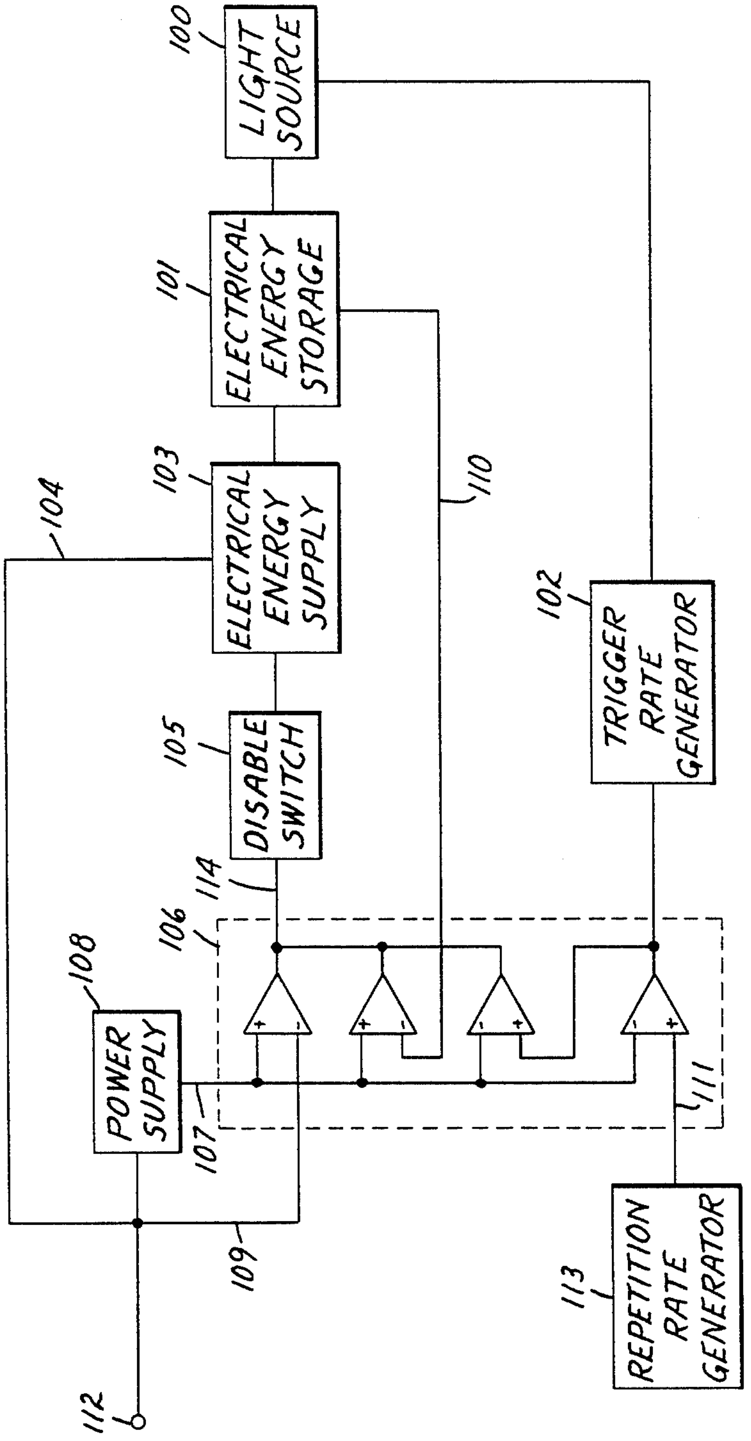
FIG. 1 is a block diagram of the present invention.

Referring to FIG. 1, the optical signal transmitter as adapted for use by priority vehicles is shown in block diagram form. In use, flashes of light from light source 100 are utilized to trigger a receiver positioned at the traffic intersection, thereby automatically switching the signal to green to give the priority vehicle the right of way, while switching conflicting approaches to red.

In the present invention, the light source 100 receives energy from an electrical energy storage means 101, causing a flash of light when the light source receives a trigger pulse from trigger pulse generator 102. The repetition rate is in turn controlled by the output on lead 111 from a trigger repetition rate generator 113. Energy for the storage means is provided by an electrical energy supply means 103, which receives power from the vehicle electrical system through vehicle voltage input lead 104. An electrically operable disable means 105 is provided to disable the electrical energy supply means 103 in response to a disable signal developed by the output of comparator means 106. The comparator means 106 receives a reference signal through reference signal lead 107 from a regulated power supply 108. Input signals are coupled to the comparator means through input leads 109, 110 and 111. The signals on these leads are indicative of measured operating conditions. The output of the comparator means is coupled through output lead 114 to of the disable means 105 to in turn disable the electrical energy supply means 103 thereby preventing light source 100 from operating in the event one of the measured operating conditions is outside an allowed range.

For example, as noted above the energy storage means 101 provides energy to excite the light source 100 and further generates a voltage on lead 110 to the comparator 106 representative of that provided to the light source 100. The comparator means 106 will generate a disable signal when the signal coupled by lead 110 exceeds a predetermined value. In this event the comparator means disables the power source 103 whenever sufficient energy has been stored in the energy storage means 101.

In a similar fashion, lead 109 from the vehicle electrical system input terminal 112 couples the voltage of the vehicle electrical system to the comparator 106. When that voltage exceeds a predetermined reference signal present on lead 107, a disable signal is generated to turn off the electrical energy supply means thus preventing damage to the optical signal transmitter circuitry when an overvoltage condition is present in the vehicle electrical system.

The repetition rate at which the light source 100 is flashed is controlled by a trigger repetition rate generator 113. The repetition rate signal from generator 113 is coupled to comparator 106 through lead 111, to both initiate the flash of the light source and to disable the electrical energy supply means as the flash is initiated. When the repetition rate signal drops below the level of the reference signal the comparator means couples a signal to the trigger pulse generator means to generate the trigger pulse for the light source. This signal is coupled through the comparator to generate a disable signal to disable electrical energy supply means 103 simultaneously. The simultaneous disable signal insures that the flash lamp will extinguish after each light pulse has occurred.

Figure 2:
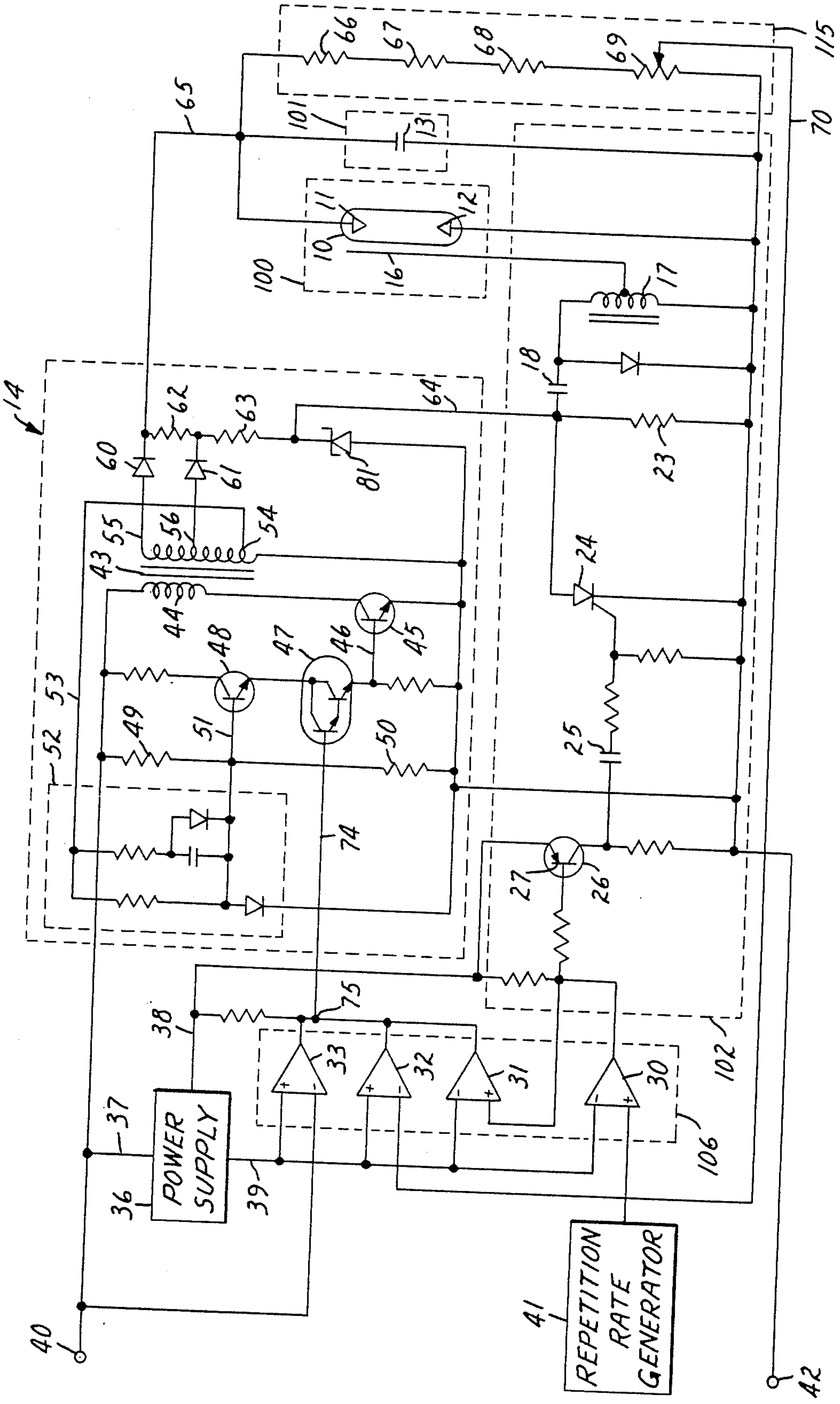
FIG. 2 is a schematic representation of the preferred embodiment of the present invention.

A specific embodiment for implementing the safeguard features is set forth in FIG. 2. In this figure, a gas discharge light source 10 having an anode 11 and a cathode 12 is shown. Flash capacitor 13, which forms the electrical energy supply means shown in parallel with the anode and cathode, is charged through a high voltage supply lead 65. When a high voltage trigger pulse is applied to trigger electrode 16, the gas within the light source 10 becomes ionized and provides a conductive path between the anode and cathode to permit the discharge of energy stored in the flash capacitor 13. The passage of current from the flash capacitor 13 through the light source 10 results in a brilliant flash of light which is repeated at a preset repetition rate to form the optical signal. The flash repetition rate is set by the trigger repetition rate generator 41 which is of conventional construction.

The manner in which the electrical energy supply means is disabled by the application of a signal from the trigger repetition rate generator 41 and other operating conditions is controlled by individual comparators 30, 31, 32 and 33. The first comparator 30, compares the trigger repetition rate signal with a regulated reference voltage supplied via reference voltage lead 39 from the regulated power supply 36. When the level of pulse rate signal goes below the reference voltage, the output of comparator 30 provides a source of current to trigger the transistor 27 of the pulse rate generator. As shown here the pulse rate generator 102 preferably includes a trigger transistor 26 the output of which is coupled through a capacitor 25 to the gate of a silicon controlled rectifier (SCR) 24. The SCR 24 in turn is coupled to a pulse transformer 17 and capacitor 18 so as to produce a pulse on lead 16 to trigger the light source 10 when the pulse generator is triggered. The current output from the first comparator 30 thus controls the operation of the trigger pulse generator. The output signal of comparator 30 is also coupled to comparator 31. This comparator draws current away from the disable means shown as a darlington pair transistor 47 by providing a current sink for current on lead 74. Consequently, the application of a trigger repetition rate signal simultaneously initiates the generation of a trigger pulse and disables the electrical energy supply means.

The initiation of the trigger pulse is accomplished by coupling a comparator signal through transistor 26 to the gate of the SCR 24. The gate signal causes the SCR to conduct, which discharges the previously charged trigger capacitor 18 through the primary winding of the trigger transformer 17. The discharge of trigger capacitor 18 induces a voltage in the trigger transformer 17 which couples a high voltage trigger pulse to trigger electrode 16 which in turn initiates the flash of light source 10. At the end of one flash cycle, both flash capacitor 13 as well as the trigger capacitor 18 are discharged. Power to recharge these capacitors is supplied by the electrical energy supply means 14 which is formed as a flyback oscillator type, dc to dc converter.

The electrical energy supply means 103 includes a transformer 43 with primary and secondary windings. An alternating current through the primary winding induces a higher voltage in the secondary winding of the transformer. The output voltage induced on the secondary winding is rectified by diodes and supplied to both the energy storage means and the trigger capacitor of the trigger pulse generator. Generation of the alternating current through the primary winding is governed by a pair of transistors 48 and 45. The operation of the alternating current source is controlled by interposing an electrically operable disable means shown as darlington pair transistor 47 between transistor 45 and transistor 48.

The electrical energy supply means 103 further includes circuitry which improves the energy conversion efficiency of the energy supply process. A supply means may be considered as a flyback oscillator, dc to dc converter which converts the nominal vehicle voltage to the higher voltages required to operate the light source. This voltage conversion is accomplished by supplying an alternating current to the primary winding 44 of the transformer 43. The changing flux in the transformer due to the alternating current induces output voltages on the secondary winding of the transformer. In the preferred embodiment, the secondary winding of transformer 43 has multiple taps 54, 55 and 56, which provide a plurality of voltages to be used by the transmitter circuitry.

A feedback tap 54 on the secondary winding provides a feedback voltage which acts to increase the current supplied to the primary winding of the transformer when the flux within the transformer "is increasing". When the current through the primary winding has reached a maximum value, the feedback signal rapidly reduces the amount of current supplied to the primary winding providing a sharp turnoff characteristic which improves the energy conversion efficiency of the electrical energy supply means.

In operation, the electrical energy supply means requires a current flow through the primary winding 44 of transformer 43. Current from the vehicle input voltage terminal 40 flows through primary winding 44 under the control of power transistor 45. Current flow through the power transistor 45 is determined by the bias current supplied to the power transistor base lead 46. Bias current for this transistor is supplied by a second transistor 48 whose output current is determined by the bias level supplied to its base lead 51. The initial bias current for transistor 48 is determined by a voltage divider formed by resistors 49 and 50 connected between the vehicle input voltage terminal and circuit common 42, which is applied to base lead 51. Current output of the second transistor 48 flows through an electrically operable switch disable means shown as darlington pair transistor 47. When the darlington pair transistor 47 is in the conducting stage, current controlled by transistor 48 flows from the automotive power supply into the base of power transistor 45 controlling the current through the primary winding 44. As the power transistor 45 begins to conduct, flux builds in the core of the transformer 43 causing a positive feedback voltage to be generated at tap 54 of the secondary winding of transformer 43. This positive feedback increases the current gain of transistor 48 which in turn supplies increased current to the base lead 46 of power transistor 45. As the gain of power transistor 45 reaches a maximum the flux on the transformer core begins to decrease and the feedback voltage changes sign. The feedback voltage at this point is negative and decreases as the current output of the transistor 48 diminishes. The reduced bias current provided by transistor 48 to transistor 45 causes the power transistor 45 to leave the saturation stage and as a consequence current flow through the primary winding of the transformer ceases. This causes the flux in the transformer quickly drop to zero, which induces a high voltage on the high voltage secondary windings of the transformer. Energy is then transferred from transformer 43 to flash capacitor 13. During this energy transfer process, transistor 48 must be held in the non-conducting state; this is accomplished by bias network 52. This energy transfer cycle is repeated until flash capacitor 13 is fully charged.

Disabling of this electrical energy supply means when the electrical storage means is fully charged is provided by a circuit 115 associated with the flash capacitor 13. A voltage divider consisting of a resistor chain 66–69 in parallel with the flash capacitor 13 produces a low voltage feedback signal proportional to the charge on the flash capacitor. This voltage is coupled to comparator 32 through feedback lead 70. The comparator compares the voltage on lead 70 with that present on reference voltage lead 39. When the voltage on lead 70 exceeds the reference voltage the output of comparator 32 provides a current sink for the current supplied to the darlington pair transistor 47 through lead 74 thus withdrawing bias current from the darlington pair and causing it to leave the conducting state. Thus the comparator 32 disables the electrical energy supply means when the charge on the flash capacitor 13 exceeds a predetermined value.

Another comparator 33 is used to compare the reference voltage on reference voltage lead 39 to the automotive input to voltage applied at terminal 40 such that a disable signal is produced if the automotive input voltage exceeds a predetermined reference value. In this instance vehicle voltage present at terminal 40 is compared in comparator 33 with a reference voltage present on reference voltage lead 39. When the vehicle voltage exceeds a predetermined value comparator 33 provides a current sink to remove current from the darlington pair base lead 74 thus turning the electrical energy supply means 14 off. This feature protects the transistors and associated electrical circuitry from an overvoltage condition occurring in the vehicle electrical system.

As described briefly before, the electrical energy supply means is disabled when a trigger pulse is initiated by the application of a trigger pulse rate signal from generator 41. When the trigger pulse signal is applied, this signal is compared by comparator 30 to the voltage level present on reference voltage lead 39. The comparator 30 draws the base of trigger transistor 26 to circuit common. The output of comparator 30 is also coupled to comparator 31. Comparator 31 in response to the output of comparator 30 draws the node 75 to circuit common 42 withdrawing current from the darlington pair transistor 47 thus disabling the electrical energy supply means 14. This feature turns off the electrical energy supply means when a trigger pulse is applied to the trigger pulse generator thus insuring that light source 10 will extinguish by permitting the flash capacitor 13 to discharge. This feature also permits the transmitter to be turned off remotely be removing the repetition rate signal. This also insures that a very low current is drawn by the electrical energy supply means when the optical signal transmitter is turned off.

Charging voltage for the trigger capacitor 18 is derived from a voltage tap 56 of power transformer 43. The current supplied by this tap is rectified by diode 61 and charges the flash capacitor 18 through a first charging resistor 63. The charging voltage is limited by a zenner diode device 81. The regulated charging voltage is supplied to the trigger capacitor 18 through supply lead 64. This charging path is the primary charging path for the trigger capacitor. However, under some operating conditions, it may be possible to discharge the trigger capacitor 18 without initiating a flash within the light source 10. Under these conditions, the trigger capacitor 18 would be fully discharged and the flash capacitor 13 would retain its charge. Since the flash capacitor 13 remains charged, the voltage feedback signal coupled through voltage feedback lead 70 will act through comparator 32 to keep the electrical energy supply means 14 turned off. To obviate this problem, a secondary charging path for trigger capacitor 18 is provided. Charge from flash capacitor 13 may be coupled through the voltage supply lead 65 to charge trigger capacitor 18 through resistor 62 and the first charging resistor 63. This alternate charging path supplies sufficient current to trigger capacitor 18 to permit a high voltage trigger pulse to be generated upon the next occurrence of the trigger pulse signal.

What is claimed is:

1. An optical signal transmitter having, a light source for converting stored electrical energy into light energy in response to a trigger signal, trigger means for providing a trigger repetition rate signal having a controlled repetition rate, electrical energy storage means, and electrical energy supply means for supplying electrical energy to said electrical energy storage means; wherein the improvement comprises means for disabling said electrical energy supply means in response to a disable signal, means for generating a reference signal, means for generating an input signal indicative of a measured operating condition, and means for comparing said reference signal with said input signal to generate said disable signal for controlling said electrical energy supply means such that said light source is operable only under predetermined operating conditions.

2. The optical signal transmitter of claim 1 wherein said input signal generating means comprises circuit means for indicating the amount of energy stored in said electrical energy storage means, to disable said electrical energy supply means when the energy stored exceeds a predetermined value.

3. The optical signal transmitter of claim 1 wherein said optical signal transmitter is connected to a vehicle having an electrical system and wherein said input signal generating means comprises circuit means for indicating the vehicle input voltage, to disable said electrical energy supply means when an over-voltage condition is present in the vehicle's electrical system.

4. An optical signal transmitter having, a light source for converting stored electrical energy into light energy in response to a trigger signal, trigger means for providing a trigger repetition rate signal having a controlled repetition rate, electrical energy storage means, and electrical energy supply means for supplying electrical energy to said electrical energy storage means; wherein the improvement comprises means for disabling said electrical energy supply means in response to a disable signal, means for generating an input signal responsive to said trigger repetition rate signal to disable said electrical energy supply means when a trigger signal is generated, means for comparing said reference signal with said input signal to generate said disable signal for controlling said electrical energy supply means such that said light source is operable only under predetermined operating conditions.

5. An optical signal transmitter, comprising:

a gas discharge light source for converting stored electrical energy into light energy in response to a trigger signal;

a trigger repetition rate generator coupled to said gas discharge light source for providing a trigger signal having a controlled repetition rate;

a capacitor coupled to said gas discharge light source to provide electrical energy storage;

an electrical energy supply coupled to said capacitor;

a disable circuit coupled to said electrical energy supply responsive to a disable signal;

a regulated power supply producing a reference signal; and a comparator coupled to said trigger repetition rate generator comparing said reference signal to an input signal indicative of a measured operating condition to generate said disable signal based upon said comparison;

whereby said gas discharge light source is operable only under predetermined operating conditions.

6. An optical signal transmitter as in claim 5 wherein said measured operating condition is the amount of energy stored in said capacitor wherein said disable signal is generated when the energy stored exceeds a predetermined value.

7. An optical signal transmitter as in claim 5 wherein said optical signal transmitter is mounted on a vehicle having an electrical system and wherein said measured operating condition is the voltage of said electrical system of said vehicle wherein said disable signal is generated when said voltage exceeds a predetermined value.

8. An optical signal transmitter of claim 5 wherein said measured operating condition is said trigger signal wherein said disable signal is generated when said trigger signal is provided.

* * * * *